United States Patent [19]
Eklund

[11] 3,769,672
[45] Nov. 6, 1973

[54] METHOD OF MAKING AN IMPROVED TEFLON-LINED SPHERICAL BEARING

[75] Inventor: Phillip R. Eklund, Dayton, Ohio

[73] Assignee: The United States of America as represented by the Secretary of the Air Force, Washington, D.C.

[22] Filed: July 31, 1972

[21] Appl. No.: 276,338

[52] U.S. Cl. .............................. 29/149.5 B, 29/401
[51] Int. Cl. ........................ B23p 11/00, B23p 7/00
[58] Field of Search ............ 29/149.5 B, 149.5 NM, 29/401, 401.7

[56] References Cited
UNITED STATES PATENTS 3,059,318  10/1962  Herbert et al. ................. 29/149.5 B
3,562,885  2/1971  McCloskey ..................... 29/149.5 B Primary Examiner—Thomas H. Eager
Attorney—Harry A. Herbert, Jr. et al.

[57] ABSTRACT

A method of repairing and retrofitting the teflon fabric liner of a spherical and/or self-aligning bearing, that has separated due to poor bonding with the bearing surface, with a metal-backed, teflon liner that includes a metal backing and a teflon skiving heat and pressure bonded thereto, and reinforced with a mechanical interlock. The metal-backed, teflon liner is initially formed into two hemispherical liner sections each inserted in position in the spherical cavity of the bearing-outer race member.

7 Claims, 11 Drawing Figures

PATENTED NOV 6 1973 3,769,672

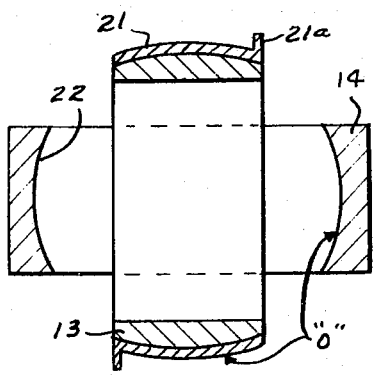
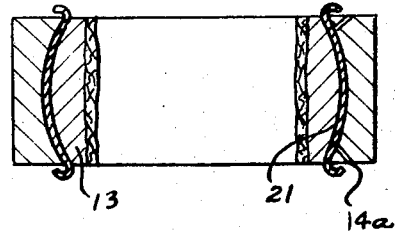
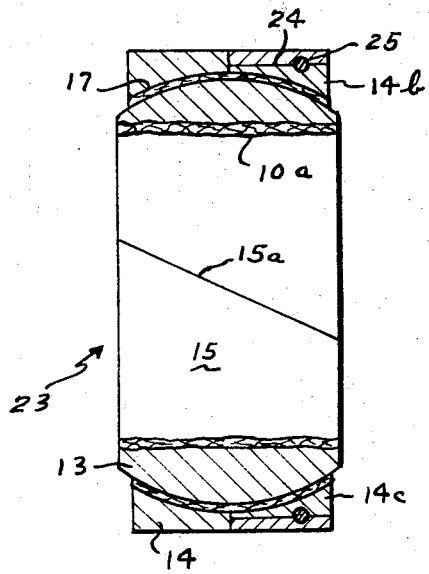

METHOD OF MAKING AN IMPROVED TEFLON-LINED SPHERICAL BEARING

BACKGROUND OF THE INVENTION

This invention relates generally to a method of making an improved metal-backed, teflon liner for use with spherical/self-aligning and other bearings.

The present invention resulted particularly from an investigation of the unsatisfactory operation of teflon fabric linings used in spherical, self-aligning bearings found in helicopter landing gear trunnions and rotors. In the present state-of-the-art, such linings are made from cotton fabric that is impregnated on one side with teflon. The cotton backing is bonded to the bearing surface of a metal cylinder to be later formed into the bearing-outer race by an epoxy bonding agent. The cylinder is then swage formed into a spherical configuration over the surface of the bearing-ball member. Unfortunately, however, this bending of the said cylinder causes a slight movement of the metal that results in the loosening of the fabric bond and the crimping of the liner at its side edge portions. The continued squeezing and pinching of the aforesaid crimped edges adds friction torque and surface traction on the bearing elements. The latter effects an increasing shear force on the fabric liner and thus its eventual failure and separation both during actual service and even while in shelf storage.

The foregoing bond failure and consequent reduction in wearability of the teflon fabric liner is eliminated by the unique teflon liner laminate structure of the present invention. The latter involves a relatively quick technique of repairing such teflon fabric liners by their replacement with a new and improved metal-backed teflon liner of greater strength and wearability, as will appear self-evident hereinafter in the following summary and detailed description.

SUMMARY OF THE INVENTION

This invention consists briefly in a method of making a metal-backed teflon laminate that includes, in unique combination, a metal backing, preferably of stainless steel, and a relatively thin, metal-filled teflon layer or skiving bonded or, in other words, laminated to the metal backing under predetermined conditions of temperature (630° F.) and pressure. The teflon skiving may comprise, but is not limited to, a sintered bronze-filled teflon composite, which previously exhibited unusual bearing characteristics when used per se as a ball bearing retainer, bushing, or as a piston skirt liner in a reciprocating compressor. This composite actually consists in general of 55 percent (by weight) of bronze powder, 5 percent of $MoS_2$, and the remainder teflon. It has been supplied as a molded and sintered component by the Modern Industrial Plastics Division of the Duriron Co.

Although the metal-backed, metal-filled teflon composite material laminated liner of the instant invention has exhibited an inherent bonding strength that exceeds that of any known epoxy bonding agent; nevertheless, another unique feature taught by the present invention resides in the provision of a mechanical interlocking means between the metal backing and the teflon skiving bonded thereto. This interlocking means is very simply achieved merely by providing the mating top surface of the metal backing, in contact with the teflon skiving, with a roughened or gridded configuration, as by means of knurling this surface. Thus, any transverse or surface shear force applied between the teflon skiving and metal backing elements will be further and substantially resisted by the reinforcing action of the knurled surface of the metal backing, in a unique concerted combined action with the metal filler particles of the teflon skiving.

Each of a pair of identical hemispherical or half bearing-liner sections may be preferably formed from an appropriately-sized piece of the above-described metal-teflon laminated structure and thereafter inserted in, and bonded to the respective portion of the bearing structure-spherical outer race cavity. An appropriate Loctite (anerobic) type of bonding agent may be used, together with the incorporation of several locking grooves or slits within the spherical cavity of the outer race member so that each half bearing-liner section may be locally swaged, dimpled or otherwise provided with a mechanical interlock within, and by means of, each of the aforesaid slits or grooves.

Other objects and advantages of the invention will readily appear hereinbelow from the following disclosure, taken in connection with the accompanying drawings, in which:

BRIEF DESCRIPTION OF THE DRAWINGS

FIGS. 8 and 8a are cross-sectional views respectively depicting successive steps in the insertion of a pair of the half bearing liner sections of FIGS. 7 and 7a, in matching relation within the spherical outer race cavity; and FIG. 9 is an additional cross-sectional view, somewhat similar to that of FIGS. 8 and 8a, but particularly depicting a modified technique of repairing the initially used, and to be replaced, teflon fabric liner.

DESCRIPTION OF THE PREFERRED EMBODIMENT

Figure 1:
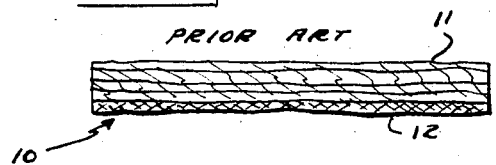
FIG. 1 is a partly schematic and sectional view of a portion of a prior art teflon fabric-liner utilizable, for example, with a spherical, self-aligning bearing to which the improvement of the present invention may be applied.

Referring generally to the draiwngs and, in particular, to FIG. 1 thereof, a prior art teflon fabric structure being used, for example, as the liner for the spherical and/or self-aligning bearings of helicopter landing gear trunnions and rotors and the like is indicated generally at 10. It consists of a cotton cloth backing and a teflon impregnated surface, indicated respectively and schematically at 11 and 12. Said teflon fabric structure liner is installed with its cotton backing 11 bonded to the inner surface of a metal cylinder, seen at 14 in FIG. 2, by means of an epoxy type of bond. The metal cylinder 14 is then swage formed over the bearing-ball section or member, indicated at 13, to form the completed bearing assembly depicted in FIG. 3. It is noted that another teflon fabric structure liner may be positioned, as as 10a, in the cylindrical bore 15 formed in the ball section or member 13.

Figure 4:
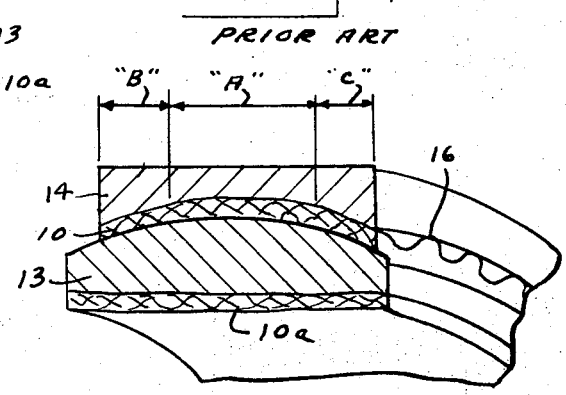
FIG. 4 is still another sectional, partly schematic and broken-away view, in perspective, illustrating the more or less typical and actual condition of the bearing assembly of FIG. 2, after or during completion of the swaging operation.

During the above-noted swaging operation, however, which is probably performed at room temperature, a slight movement of metal occurs in the bending of the metal cylinder 14 to the shape of the ball section or member 13. This relative movement of metal results in the loosening of the fabric bond and, in addition, in the crimping and/or rippling of the liner at its opposite side edge portions, as is indicated generally at the reference numeral 16 (Note FIG. 4). The further squeezing and pinching of the crimped edges, occurring for example during the completion of the bending operation, has the disadvantage of causing added friction torque to the bearing elements and, furthermore, increases both the surface traction and the shear force on the fabric liner bond to thereby eventually effect the failure and separation thereof. Actually, as an overall result of the aforementioned slight movement of metal, the fabric teflon liner remains bonded with the cylinder 14 only at its central area, indicated generally at "A", whereas, at its opposite side areas, at "B" and "C", the above-described loosening, crimping and rippligh action results in the immediate destruction or substantial destruction of the bond. Naturally, this means that a significant portion of the original epoxy bond between the teflon fabric liner 10 and the outer race member 14 is practically immediately eliminated during the fabrication of the bearing member and before any use has been made thereof. Moreover, the remaining bonded central portion "A" fails and separates relatively fast during its service and even when being placed in storage.

Figure 5:
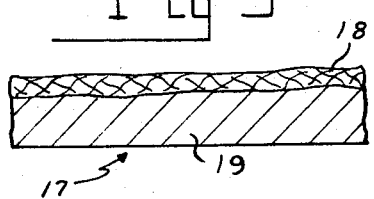
FIG. 5 is a further partly schematic, broken-away and sectional view, depicting a section of the new and improved metal-backed, teflon laminate liner of the present invention.

With particular reference to FIG. 5, a typical structure is shown, generally at 17, of the new and improved metal-backed, filled teflon bearing liner laminate of the present invention. As will appear self-evident hereinafter, the novel liner 17 involves an improved laminated structure that per se constitutes a considerable improvement over the previously-described teflon fabric liner 10 (FIG. 1) for the reason that the metal back thereof makes for an inherently stronger and more wearable arrangement. To this end, the basic structure of a typical metal-backed, teflon bearing liner, constructed in the novel manner taught by the present invention is indicated, in the aforementioned FIG. 5, generally at the previously-referred to reference numeral 17 as consisting of a thin teflon layer or skiving 18 that is bonded to a metal backing 19 under predetermined heat (650° F.) and pressure conditions desirable and effective for a particular metal. The backing 19 may consist preferably of stainless steel, whereas, the teflon skiving 18 may be comprised of a sintered bronze-filled teflon composite. Such a composite has previously exhibited unusual bearing characteristics when used as a ball bearing retainer, bushing, or as a piston skirt liner in a reciprocating compressor. This material consists in general of 55 percent (by weight) of bronze powder, 5 percent of $MoS_2$, and the remainder teflon. It is supplied as a molded and sintered component by the Modern Industrial Plastics Division of the Duriron Company.

Figure 6:
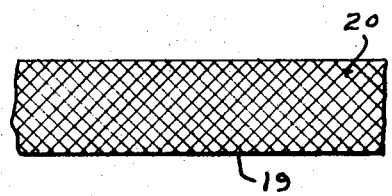
FIG. 6 is a relatively enlarged, fragmentary view, schematically depicting the gridded surface that is preferably applied to the top of the metal backing of the inventive teflon liner for providing a reinforcing mechanical interlock with the teflon skiving.

The particular novel feature of the present invention involves an improved laminate structure consisting of the above-described combination of a teflon skiving of the type referred to hereinabove, with a metal backing, as at 19 (FIG. 5), which combination, when treated under predetermined conditions of heat and pressure, as noted hereinbefore, achieves a bonding strength that exceeds that of any known epoxy bond. This inherent bonding strength within the inventive laminated liner 17 may be still further improved by the use of a simple and yet novel mechanical locking means provided by suitably roughening or gridding the mating surface of the metal backing 19, as is schematically illustrated generally at 20 in FIG. 6. In this manner, a built-in mechanical interference or interlock is used to offer added resistance against transverse or surface shear forces. Note that the required gridding may be accomplished by means of knurling the surface of the metal backing.

Figure 7:
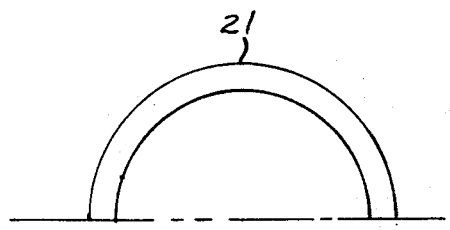
FIGS. 7 and 7a are respectively side elevational and cross-sectional views, illustrating the configuration of the half bearing liner sections in which the inventive metal-backed, teflon laminate liner of FIG. 5 may be initially formed.
Figure 7A:
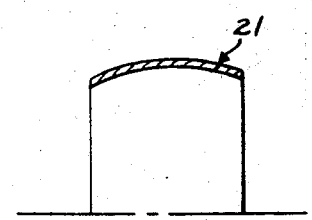

To facilitate its installation within the spherical cavity of the outer race 14, an identical and mating pair of half or hemispherical bearing liner sections may be formed from the metal-backed, metal-filled laminated liner structure 17 (FIG. 5). This hemispherical configuration is shown generally at 21 in FIGS. 7 and 7a, for example. The configuration 21 may be readily produced by any of several well-known forming procedures, one example thereof being the rubber pad, or Guerin process used in the aircraft industry for intricate shapes. As particularly depicted in the sectional views of FIGS. 8 and 8a, each liner section, as at 21, which has been previously formed by known means (not shown) into the desired configuration, may then be initially positioned, as seen in the aforementioned FIG. 8, on the outer surface of the ball-bearing section or member 13. In this connection, each bearing liner section 21 may be preformed with a lip 21a on one side and the aforesaid ball member 13 previously swung to its outer position of FIG. 8. Thereafter, after placing the hemispherical liner sections 21 over the appropriate surfaces of the previously-swung-out ball member 13, both liner sections 21 and ball member 13 are then collectively swung into the operative position relative to, and within the spherical cavity 22 of the outer race 14, as is denoted in FIG. 8a. An appropriate Loctite (anerobic) compound bonding agent may then be applied either on the surface of the metal backing 19 (FIG. 5), or on the surface of the cavity 22, or both as desired and in the areas generally indicated by the arrows "D". In this manner, an effective and strong bond is formed between the metal-backed, filled teflon liner 21 and the cavity of the outer race 14.

In addition to the use of the previously-noted, Loctite bonding agent, an additional mechanical locking means may be preferably provided to give an even stronger bond of the inventive liner 17 to the outer race 14 by incorporating several grooves or slits in the latter member, as is indicated schematically and generally at the reference number 14a. By the use of this technique, the previously-noted stronger bond is created by locally swaging, dimpling, staking and the like of the appropriate portions of the liner 21 within each of the said grooves or slits 14a.

The above-described metal/teflon laminate 17 (FIG. 5) has a significant advantage over the prior art teflon fabric structure 10 (FIG. 1) in that it can be subjected to a rather severe degree of forming or shaping without detachment of the teflon lamina or skiving 18 from the metal backing 19. Hence, the relatively mild shaping required for the production of the inventive metal-backed, filled teflon laminate will not result in any deleterious effect on the teflon bond. In this regard, the present invention also contemplates an alternate liner structure that includes the metal backing, as at 19 in FIG. 5, in a novel combination with the teflon cloth fabric structure previously used by itself. For purposes of simplification, the previously-described teflon skiving 18 of the aforementioned FIG. 5 may also represent a layer of teflon impregnated cloth that is bonded to the metal backing 19 by means of an FEP film utilizing heat (650° F.) and pressure. Again with the gridding of the top or upper surface of the metal backing 19, as at 20 in FIG. 6, to thereby effect a much stronger bond with the teflon fabric cloth 18, sufficient resistance is accomplished to compensate for the transverse or shear forces occurring either during operations, or as the result of the previously-referred to slight movement of metal taking place during the initial bending of the laminate into the desired liner shape.

Figure 2:
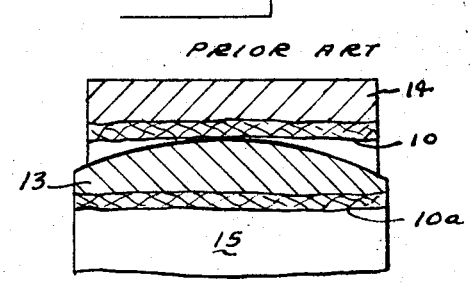
FIG. 2 is a sectional, partly schematic and broken-away view, illustrating an initial arrangement or step involved in applying the prior art liner of FIG. 1 to a metal cylinder to be swaged into a spherical bearing assembly.
Figure 3:
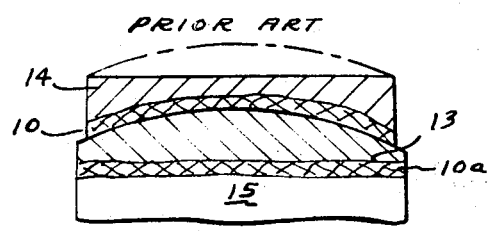
FIG. 3 is another sectional, partly schematic and broken-away view, showing the theoretical condition of the bearing assembly of FIG. 2, after the swaging operation has been completed.

Either of the above-described alternate forms of the invention; namely, the metal-backed, filled teflon laminate or the metal-backed, teflon cloth laminate may be used also as the straight laminate section, seen at 10a in both FIGS. 2 and 9, for example, for the bearing assembly indicated generally at 23 (FIG. 9). The straight laminate section 10a is fitted to the cylindrical surface of the bore 15 with a suitable taper match, as is indicated generally at 15a in the aforementioned FIG. 9. Again, by utilizing a Loctite bonding agent and applying a radial pressure thereto, the liner 10a will then be bonded to the bore surface at a much greater degree over the fabric liner. Also, the previously-described mechanical interlock may be used to supplement the bonding agent. The aforementioned FIG. 9 additionally depicts a further alternate form of the invention, whereby the previously-described, spherical half liner sections 21 may be used as inserts to replace the teflon fabric liners of helicopter trunnion or rotor bearings that have separated due to bond failure without the necessity of initially rotating the ball member 13 to its outer position, as was required in the inventive form of FIGS. 8 and 8a. This is accomplished, as is clearly illustrated in the aforementioned FIG. 9 by machining out a separate additional piece, as at 14b and 14c, in the outer race 14 at the appropriate position shown to thereby allow direct access to the liner space between the ball member 13 and the outer race 14. In this unique manner, by removing the additional pieces 14b and 14c, a teflon fabric liner, as at 10 in FIG. 1, that is in need of repair, may be easily and quickly removed and replaced with considerable facility by the half liner sections 21 of the improved liner 17 of the present invention. Each piece 14b, 14c may then be returned to the installed positions depicted in the aforementioned FIG. 9 and retained in position by a line to line or light press fit along the line indicated generally at 24, for example. To provide a more positive retention of the pieces 14b, 14c, a stainless steel wire or other plug means, as at 25, may be inserted into suitably aligned openings provided for this purpose in the separate additional pieces 14b, 14c and the adjacent outer race surfaces.

Thus, a new and improved metal/teflon laminate has been developed by the present invention for use as a relatively low cost, stronger, and more reliable and wearable replacement for the teflon fabric liner of spherical bearings currently used, for example, in helicopter trunnions and rotors.

I claim:

1. In a method of repairing or retrofitting a spherical bearing initially having a teflon fabric liner consisting of a teflon impregnated surface contacting the bearing-ball member, and a cotton cloth backing initially epoxy bonded to the bearing surface of a metal cylinder and subsequently separating therefrom due to bond failure occurring during the swage forming of the cylinder into the bearing-outer race member, the improvement comprising the steps of; forming a basic teflon laminated structure from a metal backing, a thin teflon lamina skiving bonded on the upper surface of the metal backing under predetermined conditions of heat and pressure, and first mechanical interlocking means disposed between the metal backing and the teflon skiving to thereby provide reinforcement of the bond therebetween; fabricating a pair of identical hemispherical liner laminates from the previously-formed basic teflon laminated structure; removing the teflon fabric liner from the liner space provided between the bearing-ball and outer race members; and thereafter separately installing and sealing each of the said metal/teflon-hemispherical liner laminates in a corresponding portion of the liner space in mating relation with each other.

2. In a method of repairing or retrofitting a teflon fabric-lined spherical bearing as in claim 1, and second mechanical interlocking means engaged between each of the metal/teflon-hemispherical liner laminates and the bearing-outer race member to thereby reinforce the sealed relation therebetween.

3. In a method of repairing or retrofitting a teflon fabric-lined spherical bearing as in claim 1, wherein the step of forming a basic teflon laminated structure further comprises forming a thin teflon skiving from a teflon impregnated cloth.

4. In a method of repairing or retrofitting a teflon fabric-lined spherical bearing as in claim 1, wherein the step of forming a basic teflon laminated structure further comprises forming a thin teflon skiving from a metal-filled teflon composite lamina.

5. In a method of repairing or retrofitting a teflon fabric-lined spherical bearing as in claim 4, wherein the thin teflon skiving may comprise a bronze-filled, teflon composite lamina.

6. In a method of repairing or retrofitting a teflon fabric-lined spherical bearing as in claim 1, wherein the step of separately installing each metal/teflon-hemispherical liner laminate further includes the additional steps of initially rotating the bearing-ball member to its outer position; then mounting each hemispherical liner laminate in opposed relation on the ball member; and thereafter returning the ball member to its inner position to thereby bring each of the pair of hemispherical liner laminates into the appropriate register position with the spherical cavity of the outer race member.

7. In a method of repairing or retrofitting a teflon fabric-lined spherical bearing as in claim 1, wherein the step of separately installing each hemispherical liner laminate further includes the additional steps of providing the bearing-outer race member with a pair of removable elements at opposed positions therewithin and oriented immediately adjacent to, and thereby operative to respectively lock and facilitate the removal of the teflon fabric-liner to be replaced and installation of the metal/teflon-hemispherical liner laminates without any rotation of the bearing-ball member.

* * * * *